United States Patent Office 2,952,665
Patented Sept. 13, 1960

2,952,665

HIGH MOLECULAR WEIGHT CYCLIC TRIMERS CONTAINING BLOCKED ISOCYANATE GROUPS

Wilhelm Bunge and Erwin Windemuth, Leverkusen, and Karl-Heinz Mielke, Koln-Stammheim, Germany, assignors, by mesne assignments, of one-half to Mobay Chemical Company, Pittsburgh, Pa., a corporation of Delaware, and one-half to Farbenfabriken Bayer Aktiengesellschaft, Leverkusen, Germany, a corporation of Germany No Drawing. Filed Dec. 6, 1956, Ser. No. 626,577

Claims priority, application Germany Dec. 8, 1955

6 Claims. (Cl. 260—77.5)

This invention relates to new blocked polymeric polyisocyanates and a process for preparing the same. More particularly, the invention is concerned with cyclic trimers of diisocyanates, said cyclic trimers containing three blocked isocyanato groups.

German Patent 951,168 describes a process for the production of thermostable polyisocyanates of relatively high molecular weight by the polymerization of organic polyisocyanates with the aid of tertiary amines. For the process, polyisocyanates are used which contain at least one isocyanate group in an aromatic bond. These polymers having free isocyanate groups can be reacted in known manner with hydroxyaryl compounds, whereby aryl urethanes are formed, and these can be split up again into their components by heating and consequently constitute masked polyisocyanates.

The polymers produced by the before-mentioned process have the disadvantage of being unstable during storage. Furthermore, it has proved difficult to conduct the polymerization in such manner that reproducible products with a predetermined content of free isocyanates are always obtained. Consequently, the masked polyisocyanates obtained therefrom by reaction with hydroxyaryl compounds are also of different composition, and this makes their use for the manufacture of plastics difficult.

It is, therefore, among the objects of the present invention to provide new blocked polymeric polyisocyanates. Another object of the present invention is to provide blocked polymeric polyisocyanates of reproducible composition. Another object is to provide trimers of organic diisocyanates which contain three blocked isocyanato groups. A further object is to provide blocked polymeric polyisocyanates of relatively high molecular weight which are soluble in organic solvents and which by heating can be converted into free polymeric polyisocyanates of comparable molecular weight. A still further object is to provide a simple and economical process for the production of the block polymeric polyisocyanates of the instant invention.

These objects are attained in accordance with the present invention by reacting an organic diisocyanate with a monohydroxy compound under conditions leading to polymerization.

The present invention is based on the discovery that organic diisocyanates react with monohydroxy compounds when heated either in the absence or the presence of a suitable catalyst to yield blocked polymeric polyisocyanates. It is believed that the following equations represent two reactions leading to illustrative examples of the products of the invention, R' and R'' standing for monovalent and divalent organic radicals, respectively.

(1) 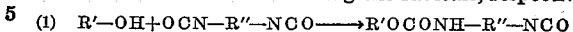

(2) 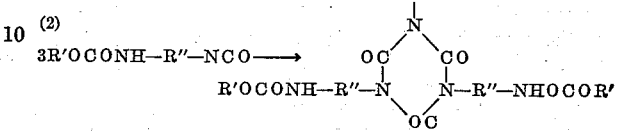

However, applicants do not wish to be restricted to any particular theory.

While the above-formulated trimer is typical of a blocked polyisocyanate formed by the reaction of one mol of a diisocyanate with one mol of a monohydroxy compound, the process of the invention will also give rise to the formation of blocked polyisocyanates of a higher molecular weight depending upon the conditions of reaction.

Any suitable diisocyanate may be used in the process of the invention, illustrative examples including hexamethylene diisocyanate, m-phenylene diisocyanate, 1-alkyl-benzene-2,4-diisocyanate, 1-alkyl-benzene-2,5-diisocyanates, 2,6-dialkyl-benzene-1,4-diisocyanates, 1-chlorobenzene-2,4-diisocyanate, dicyclohexyl methane diisocyanate, 3,3'-dimethoxydiphenylmethane-4,4'-diisocyanate, 1-nitrobenzene-2,4-diisocyanate, 1-alkoxybenzene-2,4-diisocyanate, 1-alkylbenzene-2,6-diisocyanates, m-xylylene diisocyanate, 1,3-dimethyl-4,6-bis-(β-isocyanatoethyl)-benzene, hexahydrobenzidine-4,4'-diisocyanate.

In the reaction of these diisocyanates or their mixtures with hydroxy compounds, either only some or all of the isocyanate groups present are transformed into the corresponding urethane groups, depending upon the proportions used. It is preferable to use the components in a mol ratio of diisocyanate to monohydroxy compound of from 1:0.6 to 1:2 a particularly advantageous ratio being 1:1. Phenols, aliphatic, araliphatic and hydroaromatic alcohols are suitable monohydroxy compounds, such as for example methanol, ethanol, butanol, isobutanol, octyl alcohol, cyclohexanol, benzyl alcohol, phenol, cresols or xylenols. It is of course possible to use mixtures of different monohydroxy compounds such as mixtures of butanol and phenol. Furthermore, such hydroxy compounds may be used in the process of the invention which in addition contain polymerizable double bonds for instance glycerol diallyl ether or trimethylol propane diallyl ether. These unsaturated compounds are preferably used in admixture with phenols. The temperature necessary for the reaction depends upon the monohydroxy compound to be used and upon the reactivity of the diisocyanates to be used, but generally the temperature range employed will be from 50–220° C. At these temperatures, polymerization takes place with reaction products which are easily polymerized. Usually however, in order to obtain polymerization in a suitably short time, it is expedient to add a tertiary amine as catalyst.

The amount of tertiary amine which is, if desired, to be concurrently used is comparatively small and dependent on the nature of the tertiary amine, the diisocyanate and the ratio between diisocyanate and monohydroxy compound and also the polymerization temperature. Usually amounts below 1% are sufficient for polymerization purposes.

Any suitable tertiary amine may be used as catalyst in the process of the invention, representative examples including dimethyl aniline, hexahydrodimethyl aniline, methyl morpholine, ethyl morpholine, permethylated diethylene triamine or triethylene tetramine, urethanes consisting of 1 mol of N,N-dialkylaminoethanol and 1 mol of phenyl isocyanate or cyclohexyl isocyanate, diurethanes consisting of 1 mol of N-alkyl diethanol amine and 2 mols of phenyl isocyanate or cyclohexyl isocyanate, N-dialkyl piperazine and N,N'-dimethyl ethanolamine. It is of course also possible to use mixtures of tertiary amines.

It is also possible to carry out the reaction resulting in urethanes and also the polymerization in solution. Suitable solvents are, for example, butyl acetate, methylglycol acetate, chlorobenzene or dichlorobenzene. Furthermore, in the case where the initial components are used in the mol. ratio of 1:2, it is also possible to use an excess of monohydroxy compound as solvent.

The reaction between the diisocyanates and the monohydroxy compounds which precedes the polymerization can of course also be accelerated by the aforementioned catalysts.

The polymerization is preferably carried out to such an extent that a product is formed which is still soluble in organic solvents.

This object is in general achieved when about 50% of the isocyanate groups available in the diisocyanate starting material has been polymerized. This is preferably established by preliminary tests or taking samples. The course of the polymerization can moreover be followed by titration.

After reaching the required degree of polymerization the action of the tertiary amine can be weakened or even completely stopped by adding acidly acting compounds such as hydrohalic acids, carboxylic acids or carboxylic acid chlorides.

If desired, it is also possible to produce products with the same degree of polymerization but with a smaller content of masked isocyanate groups concurrently using calculated amounts of monoisocyanates or monoamino compounds. The concurrent use of monoisocyanates leads to cyclic trimers containing an isocyanuric acid ring formed by three isocyanato groups, one or two of them being attached to a monoisocyanate molecule and the remaining two or one isocyanato groups attached to diisocyanate molecules. It is easily to be seen that such a trimer has one or two side chains which contain no functional groups at all because of the monoisocyanate used in its formation. If a monoamino compound is concurrently used with the monohydroxy compound the calculated amount of urea groups which are not broken up when heated is formed instead of urethane groups. Phenylisocyanate, α-naphthyl isocyanate or dibutyl amine are, for example, suitable for this purpose. These modified compounds are expediently added to the reaction products of diisocyanates and hydroxy compounds.

Furthermore, small amounts of polyhydroxy compounds or polyamino compounds can be concurrently used for modifying the products obtained from the process. In this case two or more trimers containing an isocyanuric acid ring may be linked together over a carbon chain derived from the polyhydroxy- or polyamino compound.

The blocked polymeric polyisocyanates of the present invention may be reacted with polyhydroxy compounds such as hydroxyl polyesters, hydroxyl polyethers and hydrogenation products of ethylene-carbon monoxide copolymers to yield polyurethane plastics. In carrying out these reactions the components are heated to a temperature at which the blocked polymeric polyisocyanate is converted into the underlying free polymeric polyisocyanate. In most cases temperatures above 140° C. are required to split off the blocking monohydroxy compound with formation of the free polymeric polyisocyanate. Once the free polymeric polyisocyanate is formed it immediately reacts with the polyhydroxy compound present in the reactive mixture. The isocyanuric acid ring is of high stability not only against the temperature used for splitting off the blocking monohydroxy compound and for the reaction with the polyhydroxy compound but even against temperatures well above 300° C.

The invention is further illustrated by the following examples in which parts and percent are by weight.

*Example 1*

32 parts by weight of methanol are gradually introduced into 160 parts by weight of 1,3-phenylene diisocyanate heated to 90° C. some of the evaporating methanol initially returning to the reaction material again due to reflux. The formation of the methyl urethane is completed after a few minutes (isocyanate content 20.9%). The temperature is slowly raised to 160° C. After a short time, the temperature raises to 240° C. without any external heating. The product now shows an isocyanate content of 1.9%. Further heating for 2 hours yields a resin which is spring-hard at room temperature, no longer has any free isocyanate groups and is soluble in acetone, ethyl acetate and methyl glycol acetate.

*Example 2*

336 parts by weight of hexamethylene diisocyanate are heated to 60° C. after adding 0.24 part by weight of a 10% solution of permethylated diethylene triamine in o-dichlorobenzene and then gradually mixed with 70.4 parts by weight of methanol while stirring. By occasional cooling, it is ensured that the temperature does not exceed 90° C. After heating for 1 hour at 90° C., the reaction product contains 18.8% of isocyanate groups. In the course of 1 hour, the product is heated slowly to 160–165° C. and the reaction material is left at this temperature, a slight degree of cooling being necessary at short intervals. After heating for 3 hours at 170° C., practically no more free isocyanate groups can be detected.

The light, highly viscous oil is clearly soluble in acetone and methyl glycol acetate.

*Example 3*

620 parts by weight of phenol are gradually added while stirring steadily to 1044 parts by weight of an isomer mixture of 2,4- and 2,6-toluylene diisocyanate heated to 160° C., the temperature being kept constant. After the reaction product has been left for another 2 hours at 160–165° C., 2,3 parts by weight of a tertiary amine obtained from 1 mol. of N-methyl diethanolamine and 2 mols. of phenyl isocyanate are added. After heating for 10 hours at 170 to 180° C. a spring-hard resin smelling of phenol is obtained, which is soluble in any proportion in ethyl acetate and methyl glycol acetate and no longer contains any free isocyanate groups. By heating with a N/1 dibutyl amine solution in chlorobenzene, it is possible to detect a content of 15.9% of isocyanate groups bonded to phenol.

*Example 4*

1188 parts by weight of technical cresol mixtures are added at 160 to 170° C. gradually to 1740 parts by weight of an isomer mixture consisting of 2,4- and 2,6-toluylene diisocyanate while stirring, the addition being so controlled that the temperature is kept between 160 and 170° C.

After adding 8.8 parts by weight of the tertiary amine described in Example 3, the reaction mixture is left for 18 hours at 160° C. The product, which is readily soluble in acetic ester, acetone and methyl glycol acetate, no longer has any free isocyanate groups and contains 15.1% of isocyanate groups bonded to cresol.

Example 5

870 parts by weight of an isomer mixture consisting of 2,4- and 2,6-toluylene diisocyanate are dissolved in 393 parts by weight of methyl glycol acetate and heated to 160° C. 702 parts by weight of m-cresol are introduced in the course of 45 minutes into the solution. After the reaction solution has been left for 3 hours at 160° C., 7.8 parts by weight of the tertiary amine described in Example 3 are added. After heating for 20 hours at 160° C., the solution contains 10.3% of isocyanate groups bonded to m-cresol. If 3.1 parts by weight of benzoyl chloride are added to the solution, even further heating for 18 hours at 160° C. does not lead to any change of the isocyanate value obtained by amine titration. The product can be diluted in any proportion with ethyl acetate.

Example 6

139 parts by weight of diphenyl-dimethylmethane-4,4'-diisocyanate are heated with 44 parts by weight of o-dichlorobenzene to 80° C. 17 parts by weight of methanol are gradually added to this solution, the temperature being maintained at 80 to 90° C. by external cooling. After heating for another hour at 90° C. an isocyanate content of 9.9% is established. The internal temperature is raised to 170° C. and the reaction mixture is kept for 3 hours at this temperature. Due to this heat treatment, the isocyanate content drops to 8.4%. 0.14 part by weight of a 10% solution of permethylated diethylene triamine in o-dichlorobenzene is now added, the temperature rising within 7 minutes to 203° C. A resin is obtained which is spring-hard at room temperature, only has 0.3% of isocyanate groups and is soluble in ethyl acetate and methylglycol acetate.

Example 7

696 parts by weight of an isomer mixture consisting of 2,4- and 2,6-toluylene diisocyanate are initially reacted at 160° C., as described in Example 3, with 562 parts by weight of a technical cresol mixture. After adding 137 parts by weight of o-dichlorobenzene, 2.5 parts by weight of permethylated diethylene triamine are added. After further heating for 3 hours at 170° C. a spring-hard resinous product is obtained which is clearly soluble in any proportion in acetic ester and has 12.0% of isocyanate groups which can be split off. If only half the amount of tertiary amine is added, the same isocyanate value is only obtained after heating for 5½ hours at 170° C. If only a quarter of the amount of catalyst is used it is necessary to heat for 18 hours at 170° C. in order to obtain the same end product.

Example 8

The dicresyl urethane of toluylene disisocyanate is first of all produced from 348 parts by weight of an isomer mixture consisting of 2,4- and 2,6-toluylene diisocyanate and 432 parts by weight of m-cresol by heating to 170° C. After heating with adjusted dibutylamine solution, the reaction product yields an isocyanate value of 21.5%. 2.72 parts by weight (=0.4%) of permethylated triethylene tetramine with a content of 24% nitrogen are then added to the clear melt. After heating for 7 hours, the melt only still has a content of 10.7% of isocyanate groups bonded to cresol. 6.7 parts by weight of benzoyl chloride are added and the heating to 170° C. is extended to 20 hours. The isocyanate content of 10.7% determined by titration remains unchanged. The clearly transparent resinous product containing free cresol is clearly soluble in acetone.

Example 9

163 parts by weight of n-butanol are run while stirring into 348 parts by weight of 2,4-toluylene diisocyanate heated to 80° C., care being taken by a small degree of external cooling that the temperature does not exceed 100° C. After the reaction mixture has been left for 1 hour at this temperature (isocyanate content=14.4%) the temperature is slowly increased. At 150° C., 0.51 part by weight of permethylated diethylene triamine is added without further heating. The internal temperature then rises in the course of 1 hour to 170° C. By titration with dibutyl amine, it is only possible to determine an isocyanate content of 1.83%, this having assumed the value of zero after heating for another 3 hours at 170° C. A resin which is spring-hard at room temperature remains, and this resin is clearly soluble in ethyl acetate and methyl glycol acetate. A reaction product of similar structure is obtained by using the same parts by weight of isobutanol.

Example 10

237.6 parts by weight of benzyl alcohol are introduced at 80 to 90° C. and while stirring constantly, into 348 parts by weight of 2,4-toluylene diisocyanate, a small degree of external cooling being necessary for dissipating the heat of reaction. After heating for 1 hour at 95 to 100° C., the reaction product contains 12.8% of isocyanate groups. After adding 0.58 part by weight of permethylated trimethylene tetramine, the temperature rises within a few minutes to 170° C., the viscosity of the reaction mixture constantly increasing. After heating for 2 hours at 170° C., a resin is obtained which is completely soluble in acetone and ethyl acetate and which no longer contains any isocyanate groups which can be detected by amine titration.

Example 11

356 parts by weight of m-cresol are run at 160° C. into 522 parts by weight of 2,4-toluylene diisocyanate. After the reaction has taken place, the product containing free isocyanate groups is left for another 2 hours at 170° C. After adding 2.6 parts by weight of permethylated triethylene tetramine, the heating is continued for another 3 hours at 170° C. The product is clearly soluble in ethyl acetate and methyl glycol acetate, and contains 14.4% of urethane groups bonded to cresol. There are no longer any free isocyanate groups. If 420 parts by weight of m-cresol are used instead of 356 parts by weight thereof, it is only after 5.5 hours under the same conditions that a product is obtained which contains the same percentage of urethane groups bonded to cresol. The properties as regards solubility remain unchanged.

Example 12

348 parts by weight of toluylene diisocyanate are first of all heated to 90° C. 286 parts by weight of n-octyl alcohol are then gradually run into the said diisocyanate while stirring and using slight external cooling. The reaction product has 11.7% of free isocyanate groups. After adding 0.755 part by weight of permethylated diethylene triamine-triethylene tetramine mixture, the reaction mixture is slowly heated to 160° C. After a reaction period of 70 minutes, the product still has 2.8% of isocyanate groups and after 2 hours and 20 minutes it still has 0.48% isocyanate groups, while it is no longer possible to detect any isocyanate content after heating for 5 hours at 165° C. The product is a resin which is spring-hard at room temperature and which is clearly soluble in ethyl acetate.

Example 13

70.4 parts by weight of methanol are gradually added at 80 to 100° C. to 348 parts by weight of an isomer mixture consisting of 2,4- and 2,6-toluylene diisocyanate while stirring and cooling. After further heating for 1 hour at 100° C., it is possible to detect an isocyanate content of 17.8% by amine titration. The reaction product is heated after 4 hours to 170° C. and then mixed with 0.15 part by weight of permethylated diethylene triamine. The temperature then rises to 180° C. After further heating for 1 hour at 180° C., a final product is obtained which is clearly soluble in any proportion in acetic ester and which no longer contains any isocyanate groups.

If no tertiary amine is added, it is necessary to heat for 22 hours at 170° C. in order to form a corresponding end product without free isocyanate groups.

*Example 14*

554 parts by weight of an isomer mixture of 2,4- and 2,6-toluylene diisocyanate are reacted at 170° C. with 446 parts by weight of cresol (isomer mixture). There are then added 111 parts by weight of o-dichlorobenzene and 100 parts by weight of phenyl isocyanate, as well as 10 parts by weight of a 10% solution of permethylated diethylene triamine in o-chlorobenzene, and the mixture is heated while constantly stirring for 6½ hours at 170° C. The resinous reaction product has 11.1% of isocyanate groups bonded to cresol and is soluble in any proportion in acetic ester.

*Example 15*

122 parts by weight of 1,3-dimethyl-4,6-bis-(β-isocyanate ethyl)-benzene are mixed while stirring at 50 to 60° C. with 16.8 parts by weight of methanol. 0.2 cc. of a 10% solution of permethylated triethylene tetramine in o-dichlorobenzene is added to the reaction product containing 14.5% of isocyanate groups and the complete mixture is heated within 1 hour to 175–180° C. The isocyanate content is now 12.4%. The temperature then rises within half an hour without external heat to 240° C. After cooling, there is left a transparent, spring-hard resin which is clearly soluble in methyl glycol acetate and which no longer contains any free isocyanate groups.

*Example 16*

131 parts by weight of dicyclohexylmethane-4,4'-diisocyanate and 16.8 parts by weight of methanol are slowly heated to 130° C. after adding 2 cc. of a 10% solution of permethylated diethylene triamine in o-dichlorobenzene, the methanol introduced initially boiling under reflux. After the boiling has ceased, which is the case after heating for about 2 hours, the temperature is raised to 175° C. (isocyanate content 13.5%). After heating for 15 hours, the resinous product which is readily soluble in cyclohexanone no longer contains any free isocyanate groups.

*Example 17*

696 parts by weight of an isomer mixture consisting of 2,4- and 2,6-toluylene diisocyanate are initially reacted with 562 parts by weight of a technical cresol mixture at 160–170° C. as described in Example 3. The solution of 145 parts by weight of dibutylamine in 137 parts by weight of o-dichlorobenzene is then added in the course of 1 hour by constantly stirring. After adding 1.2 parts by weight of permethylated triethylene tetramine, the heating is continued for another 16 hours at 170–175° C. The resinous polymer is soluble in acetic ester and contains 9.3% of isocyanate groups bonded to cresol.

*Example 18*

522 parts by weight of toluylene diisocyanate are mixed at 50–60° C. with 200 parts by weight of trimethylol propane diallyl ether. To this mixture 244 parts by weight of phenol are added at 150–160° C. within 1 hour. After adding 0.96 part by weight of permethylated diethylene triamine the reaction mixture is left standing for 10 hours at 170° C. The resin-like polymerization product thus obtained contains 8.7% isocyanate groups bonded to phenol.

The resin is soluble in common organic solvents, for instance in methyl glycol acetate.

While certain representative embodiments and details have been shown for the purpose of illustrating this invention, it will be apparent to those skilled in the art that various changes and modifications may be made therein without departing from the spirit and scope of the invention.

What is claimed is:

1. A process for the production of polymers which comprises reacting an organic diisocyanate, as essentially the sole polymer forming ingredient, with a monohydroxy compound selected from the group consisting of monohydric phenols and monohydric alcohols wherein the hydroxyl group of said monohydroxy compound is the sole group reactive with an —NCO group, the molar ratio of said monohydroxy compound to said organic diisocyanate being at least 0.6:1, and thereafter maintaining the resulting adduct at a temperature of at least about 150° C. until there are substantially no free —NCO groups in the product.

2. A process for the production of polymers which comprises mixing an organic diisocyanate, as essentially the sole polymer forming ingredient, with a monohydroxy compound selected from the group consisting of monohydric phenols and monohydric alcohols wherein the hydroxyl group of said monohydroxy compound is the sole group reactive with an —NCO group, the molar ratio of said monohydroxy compound to said organic diisocyanate being within the range of from about 0.6:1 to about 2:1, and thereafter maintaining the resulting adduct at a temperature of at least about 150° C. until there are substantially no free —NCO groups in the product.

3. A process for the production of polymers which comprises reacting an organic diisocyanate, as essentially the sole polymer forming ingredient, with a monohydroxy compound selected from the group consisting of monohydric phenols and monohydric alcohols wherein the hydroxyl group of said monohydroxy compound is the sole group reactive with an —NCO group, the molar ratio of said monohydroxy compound to said organic diisocyanate being at least 0.6:1, and thereafter maintaining the resulting adduct at a temperature of at least about 150° C. while mixed with a catalytic amount of a tertiary amine until there are substantially no free —NCO groups in the product.

4. A process for the production of a polymer capable of generating an isocyanate on heating to a temperature above about 140° C. which comprises reacting an organic diisocyanate, as essentially the sole polymer forming ingredient, with a monohydroxy compound selected from the group consisting of monohydric phenols and monohydric alcohols wherein the hydroxyl group of said monohydroxy compound is the sole group reactive with an —NCO group, the molar ratio of said monohydroxy compound to said organic diisocyanate being within the range of from about 0.6:1 to about 2:1 and thereafter maintaining the resulting adduct at a temperature within the range of from about 150° C. to about 220° C. while mixed with a catalytic amount of a tertiary amine until there are substantially no free —NCO groups in the product.

5. The process of claim 1 wherein said monohydroxy compound is butanol.

6. A compound having the formula

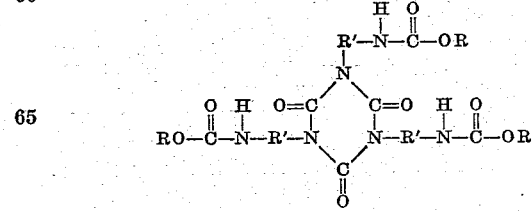

wherein R is a radical obtained by removing an hydroxyl radical from a monohydroxy compound selected from the group consisting of monohydric phenols and monohydric alcohols and R' is a radical obtained by removing two isocyanate radicals from an organic diisocyanate.

(References on following page)

References Cited in the file of this patent

UNITED STATES PATENTS

| | | |
|---|---|---|
| 2,671,082 | Stallmann | Mar. 2, 1954 |
| 2,683,728 | Mastin et al. | July 13, 1954 |
| 2,801,244 | Balon | July 30, 1957 |

FOREIGN PATENTS

| | | |
|---|---|---|
| 150,416 | Australia | Mar. 5, 1953 |

OTHER REFERENCES

Peterson: Liebigs Annalen der Chemie, vol. 562, pages 205–229 (1949).

Bailey et al.: Industrial and Engineering Chemistry, vol. 48, #4, pages 794–797 (April 1956).